United States Patent [19]
Trueblood et al.

[11] 4,267,118
[45] May 12, 1981

[54] PROCESS FOR PRODUCING FOOD GRADE SOYBEAN OIL

[75] Inventors: Troy M. Trueblood, St. Joseph; Robert H. Moulton, St. Louis County, both of Mo.

[73] Assignees: John R. Hersh; Russell E. Allen, both of St. Joseph, Mo.

[21] Appl. No.: 73,209

[22] Filed: Sep. 7, 1979

[51] Int. Cl.$^3$ .................... C09F 5/10
[52] U.S. Cl. .................... 260/428; 260/403; 260/412.2
[58] Field of Search .................... 260/420, 428, 428.5, 260/412.2, 412.5, 403

[56] References Cited

U.S. PATENT DOCUMENTS

| | | | |
|---|---|---|---|
| 766,628 | 8/1904 | Kerr | 260/420 |
| 2,282,815 | 5/1942 | Musher | 260/403 |

*Primary Examiner*—John F. Niebling
*Attorney, Agent, or Firm*—Kalish & Gilster

[57] ABSTRACT

The method of treating crude soybean oil to render it of food or commercial grade quality which comprises adding to the crude soybean oil water and a protein substance; subjecting the mixture to agitation until the mixture becomes visually homogeneous; and then permitting the agitated mixture to settle for such period of time as to permit the mixture to become stratified into four distinct, well defined layers. The supernatant or uppermost layer is the now food grade oil which is withdrawn by any suitable means.

16 Claims, No Drawings

PROCESS FOR PRODUCING FOOD GRADE SOYBEAN OIL

BACKGROUND AND SUMMARY OF THE INVENTION

This method relates in general to processes for treating crude oils obtained from oleaginous seeds and, more particularly, to a method for treating crude soybean oil to render same of food or commercial grade.

Heretofore crude soybean oil as obtained from soybeans through the practice of the various well known procedures, such as, for instance, those involving solvent extraction or by cold press, has been subjected to what has been popularly referred to as a "degumming" process. The crude oil as subjected to the last mentioned processes is customarily of a relatively dark coloration and contains various solid materials oftentimes collectively referred to as "foots" which may comprise phosphatides, lecithin, proteins, glycerides, and the like, as well as meal and seed remnants. This material is relatively thick and "gummy," having a consistency similar to that of tar. The "degumming" process is designed primarily to make the oil more manageable, as by rendering the same less "gummy," as it were, so that the same may be more easily shipped, as well as being amenable for effective further treatment. Thus, without resorting to a detailed exposition of the degumming process, since such does not constitute a part of the present invention, it may be generally stated that the crude oil is subjected to an elevated temperature as approximating 250° F. and while at such heat is highly centrifuged and with the injection of steam. Subsequent to said process, the treated oil thus has entrained therein substantially reduced amounts of solids and gums which have been in great part removed through the centrifugal action.

The resultant oil may now be treated by the well known esterification method, as with the use of methyl alcohol and distillation so as to appropriately fractionalize the treated material to produce food grade soybean oil. To produce food grade soybean oil from crude soybean oil as provided by the usual extraction processes is a markedly and recognizedly costly one requiring highly complex equipment which consumes valuable plant space and requires the supervision and attendance of highly skilled personnel.

By the present invention the various sequential procedures heretofore deemed requisite for treating crude soybean oil may be entirely eliminated, with attendant substantial saving in both investment in plant and equipment, as well as in cost of production by reason of simplicity of apparatus whereby the same is resistant to breakdown and which obviates the need for the services of highly skilled individuals. Furthermore, by the present invention, substantial saving in time is brought about so that the interval between receiving crude oil and completing treatment of same is most considerably reduced. This invention may be practiced by less affluent firms which have heretofore been caused to ship their crude oil to distant points for refining purposes. Accordingly, such firms, by virtue of the present invention, may now be in the position to sell food grade soybean oil which was hitherto denied them by reason of the particular posture of the pertinent technology.

Another drawback to the processes heretofore known for treating crude soybean oil has been the inadequacy of the same to inhibit rancidification so that the greater the factor the greater the reduction in price.

Therefore, it is an object of the present invention to treat crude soybean oil as produced by well known accepted extraction processes in a fundamentally single step procedure with attendant economy in equipment and in production costs.

It is another object of the present invention to provide a method for treating crude soybean oil as stated by well known, readily available and cheaply acquired agents.

It is a further object of the present invention to provide a method for treating crude soybean oil as described which may be practiced under atmospheric conditions, avoiding the necessity of any carefully controlled environmental conditions; and which does not necessitate the utilization of specially prepared reagents so that no preliminary treatment of the latter is requisite.

It is a still further object of the present invention to provide a method for treating crude soybean oil as stated which does not involve the services of highly skilled, trained individuals, but rather one which may be practiced by an employee with most limited prior instruction.

It is an additional object of the present invention to provide a method for treating crude soybean oil to reduce same to food grade character which in composition and properties is as good as, or better, than food grade soybean oil as provided by techniques and procedures currently known.

It is still another object of the present invention to provide a method for treating crude soybean oil as stated which is equally capable of producing desired by-products concurrently with the production of food grade oil.

Another object of the present invention is to provide a method for treating crude soybean oil which may be performed in a most expeditious, economical manner; which is productive of food grade soybean oil of consistently reliable characteristics and properties; and which, as suggested above, obviates the need for substantial investment in plant equipment and apparatus, as well as consuming costly plant space with attendant necessary fuel costs so that the overall investment for performing the said method is most economic; and which is not a high cost operation so as to be amenable to practice by relatively modest concerns.

In summary, the present invention contemplates the treatment of crude soybean oil by subjection to water and a protein containing compound. The three stated ingredients are then intermixed to present a visually homogeneous body and thereafter permitted to settle for a predetermined period of time. The settlement interval is adequate for the development of sharply delineated strata wherein the uppermost or supernatant layer is constituted of food grade soybean oil. The underlying layers as will be developed more fully hereinbelow are comprised of proteins, water and lecithin. The topmost layer, that is of now food grade oil, is removed by any suitable means, such as by decanting. It has been discovered through analysis that the removed oil may contain some water, as well as possibly some of the treatment material, which latter can be removed through the application of heat. If desired, the oil may be bleached since the coloration of soybean oils is most often determined by the quality of the seeds used.

DESCRIPTION OF THE INVENTION

In order to practice the present invention, crude soybean oil is provided for treatment. The particular method by which such crude soybean oil is provided is immaterial since this invention does not deal with techniques or processes for producing soybean oil from soybeans such as by way of the various extraction procedures, as of the solvent character wherein the oil is soluble in a particular solvent, or by mechanical means, such as cold pressing and the like. Thus, for example, the crude soybean oil for treatment pursuant to the method herein taught could have been provided by the popularly performed hexane extraction process.

As pointed out hereinabove, historically the crude soybean oil has been subjected to the so-called "degumming" process and the usual sequence of subsequent procedures. However, in the present case the crude soybean oil, which will comprehend the so-called "foots" being a gummy mass of various materials and compounds, such as phosphatides, lecithin, proteins, meal, seed remnants and the like, has added thereto a predetermined relative quantity of water and a protein containing compound. The water and protein compound may be charged directly to the crude soybean oil as in a large vat or other suitable vessel or receptacle which has been adapted for agitation. Also such vessel, for purposes presently appearing, may be entirely transparent or, more simply, provided with a window or transparent section extending from top to bottom. The addition of the water and protein compound is effected under ambient conditions so that all of the components of the systems are at room temperature and with there being no need for controlling atmospheric pressure, humidity or other environmental factors. After the provision of the water and protein the entire system is then subjected to agitation which is desirably at a rapid frequency so as to bring about a most efficacious intermixture. The agitating step is continued until the attendant is satisfied by visual inspection as through the aforesaid window, that the contents of the vessel are now sufficiently intermixed to present a homogeneous appearing body. Thereupon the agitation is discontinued and the intermixed material allowed to settle for such period of time as may be necessary to bring about a sharply defined stratification of the vessel contents, with such condition again being determined through visual inspection. Normally, four predominant layers are created and with the interface between the same being most sharply evident. The topmost or supernatant layer will be constituted of the now treated soybean oil which is of food or commercial grade character. This layer may be withdrawn by any suitable means. The second layer, through analysis, has been found to be comprised substantially of protein material while the third layer from the top is water and the bottom-most layer is constituted substantially of lecithin.

Thus, as shown above, the procedure of the present invention is of marked simplicity, requiring nothing more than the addition of certain common, inexpensive agents under room conditions and with merely the agitation and subsequent settlement of the intermixed material. This procedure in its simplistic character is indeed as far cry from the multistage techniques practiced heretofore for reducing crude soybean oil to food grade soybean oil.

More specifically, the amount of water added to the crude soybean oil is within the range of 40–60% of the volume of such oil. The protein material or compound to be added bears a relationship to the crude soybean oil so that approximately 3 to 8 grams of such compound is interjected for each 400 milliliters of oil. It is quite apparent that in large batch operations, these relationships could be appropriately stated in liters and kilograms but for purposes of exposition herein the smaller amounts are utilized.

Among the protein materials suitable for use with the present invention are various enzymes all of which are, recognizedly, protein substances, such as, for example, trypsin, pepsin and pancreatin, which are but illustrative of such organic substances; and including brewers yeast which contains a multiplicity of enzymes, such as amylase, protease, lipase, etc., so that mixtures of the same are equally effective; a further example being Rid-X*; as well as nonenzymatic substances, as for example, casein, gelatin, egg albumin globulin, Fibrin A and the like, as well as blends thereof.

*Rid-X is a trademark of D-Con Company for a commercial septic tank enzymatic preparation containing various enzymes, such as amylase, protease and lipase as well as cellulase.

Observing the general formulation above set forth, the following laboratory tests were effected to demonstrate the efficaciousness of the present invention. In order to simplify a study of the following examples, in each instance a quantity representative of 400 milliliters of crude soybean oil as prepared by the common hexane process was provided within a 600 milliliter bottle, to which was added 200 milliliters of water, and with there being six such vessels so provided. To these six vessels there were respectively added 5 grams of each of the following protein substance: brewers yeast; Rid-X, trypsin, pepsin, pancreatin and casein. Each of the six vessels or flasks were then thoroughly mixed by agitation until the mixture gave a completely homogeneous appearance whereupon each mixture was allowed to settle for a period of no less than 24 hours.

After such settling, the supernatant, or oil, was separated from the other layers and analyzed for protein content by the Kjeldahl nitrogen method. The protein level in the supernatant oil or that being separated from the treatment vessels as above described, was found to be less than 0.1 gram protein per 100 grams of oil (0.1%). A protein analysis of the crude soybean oil prior to treatment in accordance with the present invention showed a level of 1.5 gram protein per 100 grams of oil (1.5%).

In order to effect a comparison between the oil provided by the practice of the present invention and food grade soybean oil as produced through currently known procedures, a sample of the oil as separated subsequent to settlement in the above outlined examples was dried and following transesterification was analyzed by a gas chromatograph using a polar column at 188° C. The analysis of the transesterification products of all such oils namely, those produced by the present invention and the food grade oil provided by known methods showed a low level of $C_{16}$ fatty acids (8 to 10%) and a high level of $C_{18}$ fatty acids. Such analysis verified that no changes occurred in the composition or relative amounts of the fatty acid constituents present in the crude oil upon treatment with water and the protein substance. Thus, the present invention is uniquely competent to produce a food grade soybean oil having a composition which is equivalent to that found in the food grade soybean oils provided by techniques in common practice.

Further experimentation demonstrated that the water may be within a range of 40–60% of the volume of the crude soybean oil without lessening of the quality of the resultant oil and similarly the range of 3–8 grams per 400 milliliters of crude soybean oil has been proved equally efficacious.

In the event the resultant oils separated by using the present method are found to be saturated with water, the level thereof can be simply and effectively reduced by subjection to heat.

Thus, the present invention provides a food grade soybean oil which is demonstrably as good, if not more improved, in quality than available food grade oils with comparable miniscule protein levels and fatty acid content.

The fact that the present method may be practiced by utilizing protein substances other than enzymes appears to have established that it is the presence of protein which conduces to the removal of the protein present in the crude soybean oil. The mechanism of this reaction is not entirely understood, although it might very well be a protein salting-out action. It is quite evident that enzymes, all of which are protein substances, are most effective in the performance of this method, but without prejudice to further research, it would seem that it is the protein content which is productive of the results rather than classic enzymatic action.

In order to establish the necessity of a protein content, various inert compositions were utilized in lieu thereof, such as Celite, which is a trademark of Johns-Manville Corporation for diatomaceous earth, as well as fuller's earth and other similar inert matter, and in each instance there was no separation of the protein from the crude oil so that such efforts would not produce a food grade oil.

With respect to the second, third and fourth layers, working downwardly, which were developed through the settling of the intermixture above described, the second layer is constituted substantially of protein material, both that withdrawn from the crude soybean oil, as well as the protein substance introduced into the system. Also, this layer may contain a small quantity of intermixed oil and water.

The third layer from the top is substantially entirely water, all of which emanates from that interjected into the mixture. The bottom-most layer is substantially entirely lecithin so that the method herein taught is concurrently competent to produce not just a food grade soybean oil, but to also separate a very valuable ingredient having numerous nutritional and other recognized applications namely, lecithin.

Having described our invention, what we claim and desire to obtain by Letters Patent is:

1. The method of producing food grade soybean oil comprising providing a predetermined quantity of crude soybean oil, adding to said crude soybean oil under ambient conditions a predetermined quantity of water and a predetermined quantity of protein substance, then subjecting the crude soybean oil, water, and protein substance to agitation for forming a mixture thereof, subsequent to said agitation permitting the mixture to settle, and then drawing off the oil.

2. The method of producing food grade soybean oil as defined in claim 1 and further characterized by the agitation, settlement, and drawing off being effected under ambient conditions.

3. The method of producing food grade soybean oil as defined in claim 1 and further characterized by the protein substance being from the class consisting of enzymes, non-enzymatic substances, and mixtures thereof.

4. The method of producing food grade soybean oil as defined in claim 1 and further characterized by agitating under ambient conditions the crude soybean oil, water, and protein substance for a period of time requisite to cause the developed mixture to appear visually homogeneous.

5. The method of producing food grade soybean oil as defined in claim 1 and further characterized by permitting the agitated mixture to settle for that period of time requisite for the mixture to become stratified into four clearly defined layers and with the food grade soybean oil constituting the uppermost layer.

6. The method of producing food grade soybean oil as defined in claim 5 and further characterized by the quantity of water being added to the crude soybean oil being treated being between 40–60% by volume of said crude soybean oil.

7. The method of producing food grade soybean oil as defined in claim 6 and further characterized by the protein substance being from the class consisting of enzymes, non-enzymatic substances and mixtures thereof, said substance being in a proportion of between 3 and 8 grams per 400 milliliters of crude soybean oil.

8. The method of producing food grade soybean oil as defined in claim 1 or 7 and further characterized by the protein substance being from the class consisting of enzymes, mixtures of enzymes, brewers yeast, and casein, egg albumin, globulin, gelatin and mixtures thereof.

9. The method of producing food grade soybean oil as defined in claim 8 and further characterized by the enzymes including trypsin, pancreatin, pepsin, amylase, protease, lipase.

10. The method of producing food grade soybean oil as defined in claim 5 and further characterized by the second to the top layer containing protein, the third to the top layer being water, and the bottom or fourth to the top layer being lecithin.

11. The method of producing food grade soybean oil as defined in claim 1 and further characterized by subjecting the withdrawn oil to heat for eliminating any water entrained therein.

12. The method of producing food grade soybean oil as defined in claim 1 wherein the withdrawn oil contains less than approximately 0.1 gram protein per 100 grams of oil.

13. The method of producing food grade soybean oil as defined in claim 5 wherein the lowermost layer is constituted of lecithin.

14. The method of producing food grade soybean oil as defined in claim 1 wherein the quantity of water being added to the crude soybean oil is between 40–60% by volume of said crude soybean oil and the protein substance being added is in an amount of between approximately 3–8 grams per 400 milliliters of crude soybean oil.

15. The method of producing food grade soybean oil as defined in claim 14 wherein the agitation of the crude soybean oil, water, and protein substance continues for a period of time requisite to cause the developed mixture to appear fully homogeneous, and wherein the protein substance is from the class consisting of enzymes, non-enzymatic substances, and mixtures thereof, the agitation, settlement, and drawing off being effected under ambient conditions.

16. The method of producing food grade soybean oil as defined in claim 5 and further characterized by permitting the agitated mixture to settle for that period of time requisite for the mixture to become stratified into four clearly defined layers and with the food grade soybean oil constituting the uppermost layer.

* * * * *

UNITED STATES PATENT OFFICE
CERTIFICATE OF CORRECTION

Patent No. 4,267,118 Dated May 12, 1981

Inventor(s) Troy M. Trueblood and Robert H. Moulton

It is certified that error appears in the above-identified patent and that said Letters Patent are hereby corrected as shown below:

Column 6, Claim 16, line 63, change "5" to ---15---.

Signed and Sealed this

*Eighteenth* Day of *August 1981*

[SEAL]

*Attest:*

GERALD J. MOSSINGHOFF

*Attesting Officer* *Commissioner of Patents and Trademarks*